(12) United States Patent
Wang et al.

(10) Patent No.: US 10,303,626 B2
(45) Date of Patent: May 28, 2019

(54) APPROACH FOR CHIP-LEVEL FLOP INSERTION AND VERIFICATION BASED ON LOGIC INTERFACE DEFINITION

(71) Applicant: CAVIUM, LLC, San Jose, CA (US)

(72) Inventors: Weihuang Wang, Los Gatos, CA (US); Premshanth Theivendran, Foster City, CA (US); Nikhil Jayakumar, San Jose, CA (US); Gerald Schmidt, San Jose, CA (US); Srinath Atluri, Fremont, CA (US)

(73) Assignee: Cavium, LLC., Santa Clara, CA (US)

( * ) Notice: Subject to any disclaimer, the term of this patent is extended or adjusted under 35 U.S.C. 154(b) by 229 days.

(21) Appl. No.: 14/675,342

(22) Filed: Mar. 31, 2015

(65) Prior Publication Data

US 2016/0291932 A1 Oct. 6, 2016

(51) Int. Cl.
*H05K 7/10* (2006.01)
*G06F 13/16* (2006.01)

(52) U.S. Cl.
CPC ...... *G06F 13/1615* (2013.01); *G06F 13/1642* (2013.01); *G06F 13/1673* (2013.01)

(58) Field of Classification Search
CPC ............. G06F 13/1673; G06F 13/1615; G06F 13/1642
USPC ........................................ 710/301
See application file for complete search history.

(56) References Cited

U.S. PATENT DOCUMENTS

| 6,065,144 | A | * | 5/2000 | Knoch | G01R 31/31921 |
| | | | | | 714/724 |
| 7,363,606 | B1 | | 4/2008 | Mo et al. | |
| 2004/0153984 | A1 | | 8/2004 | Akkiraju | |
| 2009/0285390 | A1 | * | 11/2009 | Scherer | G06F 21/51 |
| | | | | | 380/44 |
| 2014/0189633 | A1 | * | 7/2014 | Yamamoto | G06F 17/505 |
| | | | | | 716/134 |
| 2015/0156129 | A1 | * | 6/2015 | Tsuruoka | H04L 47/193 |
| | | | | | 370/235 |
| 2016/0087866 | A1 | * | 3/2016 | Modai | H04L 43/0841 |
| | | | | | 709/231 |

* cited by examiner

*Primary Examiner* — Chun Kuan Lee

(57) ABSTRACT

Systems and methods for inserting flops at the chip-level to produce a signal delay for preventing buffer overflow are disclosed herein. Shells of modules described in an RTL description and their connections are analyzed to determine a signal latency between a sender block and a receiver block. The logical interfaces of the shells are grouped in a structured document with associated rules. Flops are inserted between the sender block and the receiver block to introduce a flop delay to meet physical design timing requirement and prevent a buffer of the receiver block from overflowing due to data that is already in-flight when a flow control signal is sent by the receiver block. The sum of a delay on a data line and a delay on a flow control line measured in clock cycles must be less than a depth of the buffer.

36 Claims, 4 Drawing Sheets

APPROACH FOR CHIP-LEVEL FLOP INSERTION AND VERIFICATION BASED ON LOGIC INTERFACE DEFINITION

CROSS-REFERENCE TO RELATED APPLICATIONS

This patent application is related to and incorporates by reference herein in its entirety, the following patent application that is co-owned and concurrently filed herewith: (1) U.S. patent application Ser. No. 14/675,403, entitled Automatic "APPROACH FOR LOGIC SIGNAL GROUPING AND RTL GENERATION USING XML" by Theivendran et al.

FIELD OF THE INVENTION

Embodiments of the present invention generally relate to the field of integrated circuit design. More specifically, embodiments of the present invention relate to flow control techniques for preventing buffer overflow.

BACKGROUND OF THE INVENTION

In the field of digital circuit design, flow control signals are used to manage the rate of data transmitted between two nodes of a chip (flow control). One objective of flow control is to prevent a relatively fast sender node from overwhelming a relatively slow receiver node with data. For example, the receiver node may receive a heavier traffic load than the sender node, or the receiver node may have less processing resources than the sender node. In another example, the receiver node may have a queue with a limited size. When the sender node transmits data too rapidly, the queue will become full and unable to store subsequent transmissions (overflow). A receiver node with a full queue will send a flow control signal to the sender node to cause the sender node to stop transmitting data to the receiver node until there is sufficient room in the queue.

An RTL (register-transfer level) abstraction is used by hardware description languages (HDLs) to generate lower-level logical representations of digital circuits modeled by an RTL description. Verilog and VHDL are two of the most common HDLs used today. Using HDLs, designers declare the registers and describe the combination logic using constructs such as if-then-else and arithmetic operations. An RTL description is typically converted to a gate-level description of the digital circuit using a logical synthesis tool. The gate-level description is then used by placement and routing tools to generate a physical layout, and logical simulation tools may be used to verify the integrity of an RTL description. An RTL description typically consists of a hierarchy of modules. The modules communicate with each other using a set of declared input, output, and bidirectional interfaces. A module may perform a particular function, or store and/or transmit signals (e.g., data) to other modules, for example.

After the functional blocks of a chip have been modeled using RTL, for example, the design process proceeds to the physical design stage, which may include routing, timing analysis, and timing closure stages. Based on position, orientation, and routing decisions for functional blocks made during the physical design stage, functionally identical functional blocks may experience different signal delays/latency when transmitting data between blocks. At this stage in the design process, certain aspects of the chip design, such as buffer size, are locked-in or "frozen" and cannot be changed or adjusted without considerable time and effort to redesign the physical layout of the chip. Therefore, it is more desirable to introduce a signal delay at the chip-level to prevent buffer overflow rather than redesigning the physical layout of the chip.

SUMMARY OF THE INVENTION

Accordingly, embodiments of the present invention provide systems and methods for inserting flops at the chip-level to produce a signal delay for preventing buffer overflow and satisfying chip-level physical design timing requirement. Shells of modules described in an RTL description and their connections are analyzed to determine a signal latency between a sender block and a receiver block. The logical interfaces of the shells are grouped in a structured document with associated rules. Flops are inserted between the sender block and the receiver block to introduce a flop delay to prevent a buffer of the receiver block from overflowing due to data that is already in-flight when a flow control signal is sent by the receiver block. The sum of a delay on a data line and a delay on a flow control line measured in clock cycles must be less than a depth of the buffer.

Embodiments of the present invention include a method for producing a signal latency to satisfy physical design timing requirement and prevent buffer overflow. A first flop latency of a data bus between a sender block and a receiver block including a buffer is determined. A first set of one or more flops are inserted on a flow control line between the sender block and the receiver block to produce a second flop latency, where the flow control line transmits a flow control signal from the receiver block to the sender block, and a total number of flops on the flow control line and the data bus is constrained by a depth of the buffer. A round trip latency based on the first flop latency and the second flop latency is less than a depth of the buffer, and the first flop latency, the second flop latency, and the round trip latency are measured in clock cycles.

Other embodiments of the present invention describe a system including at least one processor and at least one computer-readable storage device comprising instructions that when executed cause performance of a method for producing a signal latency to prevent buffer overflow. The method includes determining a first flop latency of a data bus between a sender block and a receiver block including a buffer. A first set of one or more flops are inserted on a flow control line between the sender block and the receiver block to produce a second flop latency, where the flow control line transmits a flow control signal from the receiver block to the sender block, and a total number of flops on the flow control line and the data bus is based on a depth of the buffer. A round trip latency based on the first flop latency and the second flop latency is less than a depth of the buffer, and the first flop latency, the second flop latency, and the round trip latency are measured in clock cycles.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1A:
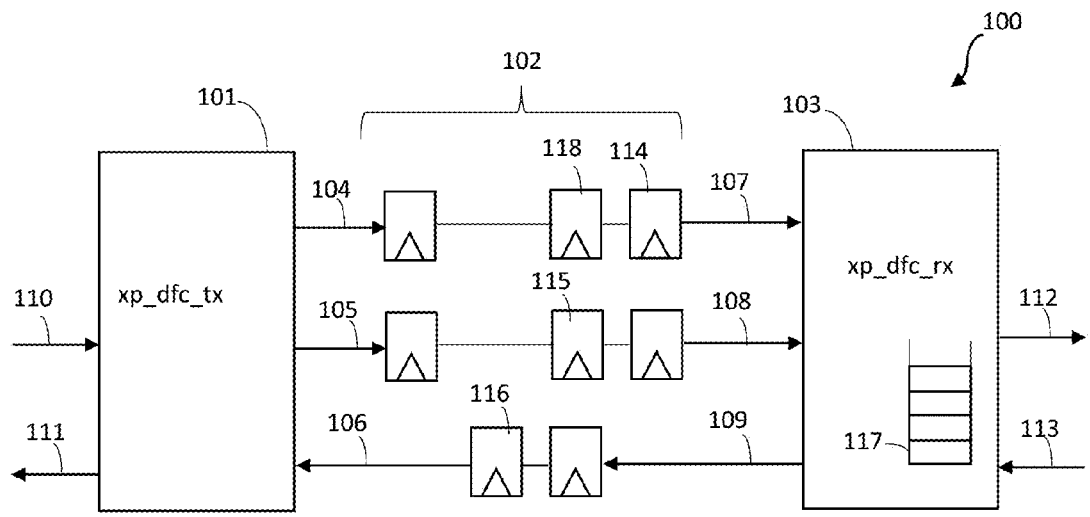
FIG. 1A is a block diagram illustrating a logical view of an exemplary set of modules with top-level staging according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Embodiments are well suited to performing various other steps or variations of the steps recited in the flowchart of the figures herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computing device. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "reading," "associating," "identifying" or the like, refer to the action and processes of an electronic computing device that manipulates and transforms data represented as physical (electronic) quantities within the system's registers and memories into other data similarly represented as physical quantities within the system memories or registers or other such information storage, transmission or display devices.

In the foregoing detailed description of embodiments of the present invention, numerous specific details have been set forth in order to provide a thorough understanding of the present invention. However, it will be recognized by one of ordinary skill in the art that the present invention is able to be practiced without these specific details. In other instances, well-known methods, procedures, components, and circuits have not been described in detail so as not to unnecessarily obscure aspects of the embodiments of the present invention. Although a method is able to be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part.

Chip-Level Flop Insertion and Verification

With regard to FIG. 1A, a logical view of an exemplary set of modules 100 with top-level staging is depicted according to embodiments of the present invention. Sender block 101 transmits data to receiver block 103, and receiver block 103 receives the data and can use queue/buffer 117 to temporarily store incoming data while other data is being processed. According to some embodiments, queue 117 is a first-in first-out (FIFO) queue. The logical interfaces between sender block 101 and receiver block 103 are depicted in top-level staging 102. The logical interfaces are also grouped in a structured document (e.g., an XML, file) used to generate an RTL description of the chip design.

Outgoing data interface 104 is used by sender block 101 to send data to receiver block 103. Receiver block 103 receives the data sent by sender block 103 using incoming data interface 107. Incoming data interface 107 and outgoing data interface 104 communicate using a data line, or one or more data buses. One or more flip-flops (e.g., flip-flop 114) may be logically disposed between outgoing data interface 104 and incoming data interface 107. Flip-flop 114 is configured to introduce a clock-cycle delay (e.g., a propagation delay) to satisfy a timing requirement between sender block 101 and receiver block 103. Each data line or data bus must have the same delay (e.g., the same number of flops) as the other data lines/buses in the same logic interface.

Outgoing validation interface 105 is used by sender block 101 to validate data sent to receiver block 103. Receiver block 103 receives a validation signal sent by sender block 103 using incoming validation interface 108. Incoming validation interface 105 and incoming validation interface 108 communicate using a validation line, or one or more validation buses. One or more flip-flops (e.g., flip-flop 115) may be logically disposed between outgoing validation interface 105 and incoming validation interface 108. Flip-flop 115 is configured to introduce a clock-cycle delay (e.g., a propagation delay) to satisfy a timing requirement between sender block 101 and receiver block 103. Each validation line or validation bus must have the same delay (e.g., the same number of flops) as the other validation lines/buses, as well as data lines/buses in the same logic interface.

Sender block 101 and receiver block 103 may perform other functions in addition to sending or receiving data. Sender block 101 can send data and/or control signals using outgoing interface 111, and can receive data using incoming interface 110. Receiver block 103 may receive flow-control signals from other modules (e.g., downstream logic) using incoming interface 113, and may send data to other modules using outgoing interface 112.

Outgoing flow control interface 117 is used by receiver block 103 to coordinate the timing of data transfers with receiver block 103. Receiver block 103 sends a flow signal on a flow control line to sender block 103 using outgoing flow control interface 109. The flow control signal is received by sender block 101 using incoming flow control interface 106. One or more flip-flops (e.g., flip-flop 116) may be logically disposed between outgoing flow control interface 109 and incoming flow control interface 106. Flip-flop 116 is configured to introduce a delay (e.g., a propagation delay) to meet a physical design timing requirement between sender block 101 and receiver block 103.

Figure 1B:
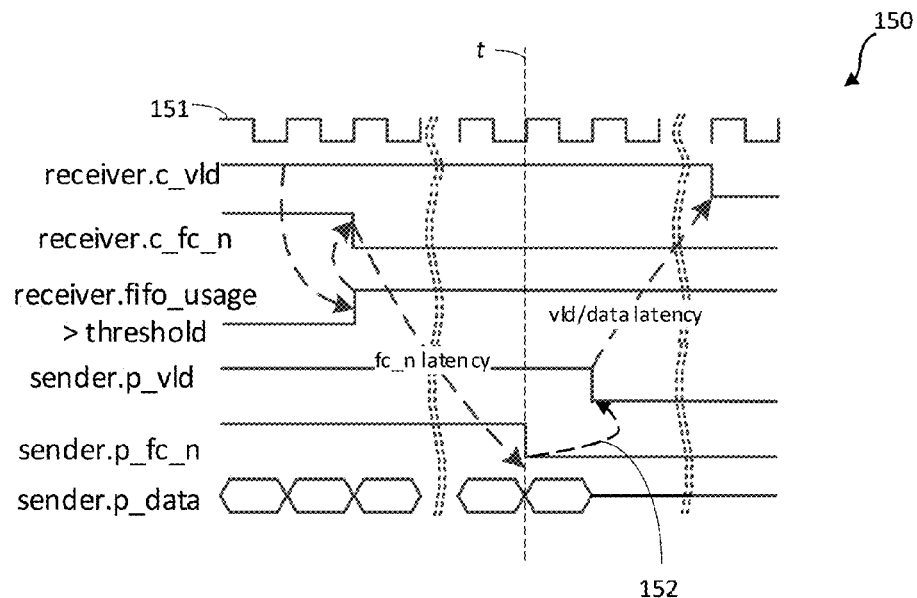
FIG. 1B is a timing diagram illustrating an exemplary timing of signals of the logical interfaces between a sender block and a receiver block according to embodiments of the present invention

With regard to FIG. 1B, a timing diagram illustrating an exemplary timing 150 of the logical interfaces between sender block 101 and receiver block 103 is depicted according to embodiments of the present invention. Flow control signals sent by receiver bock 103 are used to control the transfer rate of data sent by sender block 101. When a flow control signal having a low value (e.g., 0) is received by sender block 101, the sender block stops sending data to receiver block 103 until a flow control signal having a high value (e.g., 1) is received by sender block 101.

The signals sent between sender block 101 and receiver block 103 are synchronized using clock signal 151. At a time t, receiver block 103 sends a flow control signal to sender block 101. Due to a reaction delay of the sender block, sender block 101 continues to transmit data until one additional clock cycle has passed. After a flow control signal with a low value is received by the sender block 101 and one clock cycle has passed, the sender block 101 stops sending data to receiver block 103 until a flow control signal having a high value is received by sender block 101.

When receiver block 103 is busy (e.g., processing data), data received from sender block 101 is temporarily stored in queue/buffer 117. After a flow control signal has been sent to sender block 101, a delay of the flow control line and/or a reaction delay may cause additional data signals to be sent by sender block 101 before the flow control signal is actually received by the sender block 101. If the size/depth of queue 117 is not large enough, data that is received by receiver block 103 after queue 117 is full will not be received. The depth of queue 117 should be sufficiently large to accommodate all data signals that are "in-flight" (e.g., have already been sent but not yet received) when a flow control signal is sent by receiver block 103, as well as the additional data signals the sender block may keep sending before the sender block receives and reacts to the flow control signal.

A first design constraint can be described as DelayA+DelayB<Buffer Depth, where DelayA is the time a data signal takes to travel from sender block 101 to receiver block 103, DelayB is the time a flow control signal takes to travel from receiver block 103 to sender block 101, and buffer depth is the number of items that can be stored in queue 117 at one time. The sum of DelayA and DelayB is considered the round trip delay. DelayA and DelayB are measured in clock cycles. According to some embodiments, a time taken by sender block 101 to react to a received flow control signal DelayC is also considered, where the design constraint is DelayA+DelayB+DelayC<buffer depth.

During an initial design phase of a chip, a first order physical design analysis estimates signal delays between a sender block and a receiver block. Based on this estimation, an initial depth (e.g., a FIFO depth) is used to configure queue 117 of receiver block 103. During a physical design stage, a per-wire delay requirement is determined and may be used to determine an optimal buffer depth that is different than the initial depth. However, during the physical design stage, certain components and/or features of a chip design may be fixed or "frozen" such that changes cannot be made without unreasonable delay or expense. To ensure that the round trip delay between the sender and receiver blocks is sufficient to accommodate a queue of fixed depth, additional delay may be added to the data lines or buses or to the flow control lines by inserting additional flip-flops. For example, flip-flop 118 may be added to a data line between data interfaces 104 and 107 to increase the delay of data signals between sender block 101 and receiver block 103 so that receiver block 103 has additional time (e.g., clock cycles) to process data that is already stored in queue 117 before new data is received and potentially added to the queue.

Figure 2A:
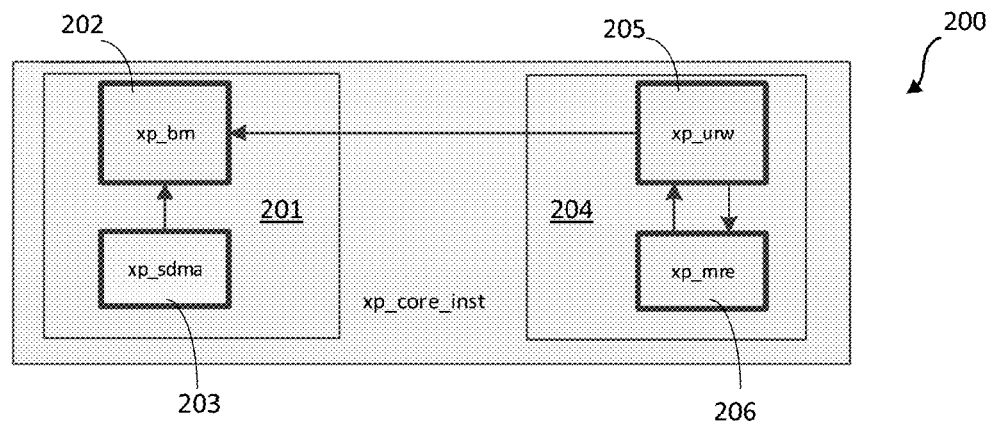
FIG. 2A is a block diagram depicting an exemplary instance of modules comprising a sender block and receiver block according to embodiments of the present invention.

With regard to FIG. 2A, an exemplary instance 200 of modules comprising a sender block and receiver block is depicted according to embodiments of the present invention. The logical interfaces of the sender block 204 and the receiver block 201 are defined in an RTL description, and the logical signals of those interfaces are logically grouped and associated with defined rules/protocols in a structured document (e.g., an XML document). It is important that data and validation signals within the same logical interface instance experience substantially the same latency at the chip level. For the purposes of this disclosure, how the signals are grouped and the functions performed by the modules (e.g., sender block 204 and receiver block 201) may be ignored.

Figure 2B:
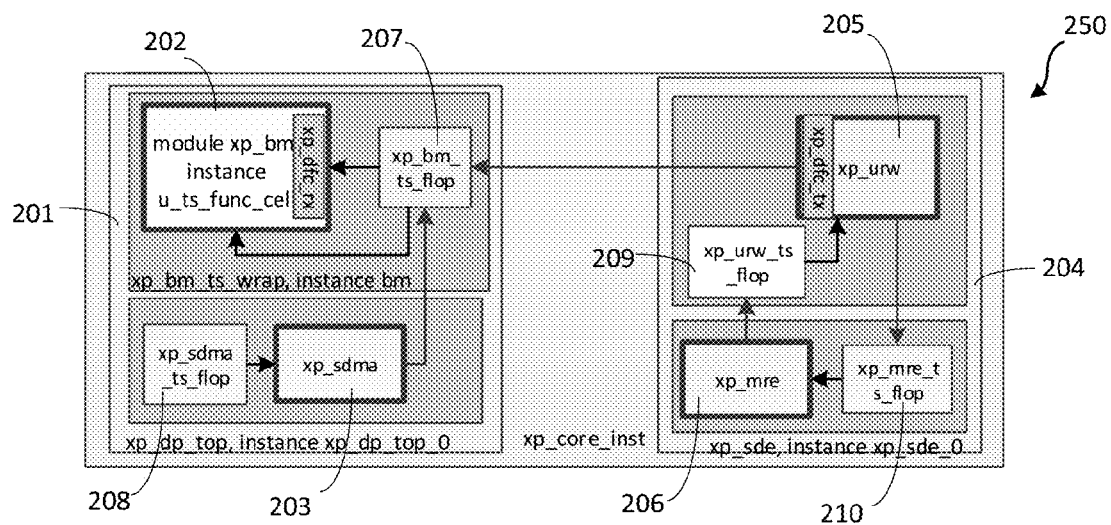
FIG. 2B is a block diagram depicting an exemplary sender block wrapper and receiver block wrapper with top-level flops for producing a signal delay according to embodiments of the present invention.

Sender block 204 comprises two blocks that exchange data, block 206 and 205. Additionally, block 205 communicates data to receiver block 201. Sender block 201 comprises blocks 203 and 202. Block 203 sends data to block 202, and block 202 receives data from sender block 204. FIG. 2B depicts sender block 204 and receiver block 201 with top-level flops 207-210 added to produce a signal delay in instance 250. A receiver wrapper comprising two flip-flops ("flops") 208 and 207 is automatically generated for receiver block 201 based on logical signal groupings defined using a structured document and the design constraints discussed above. Specifically, the round trip delay comprising a delay of a data signal and a delay of a flow control signal between the sender and receiver block must be less than a buffer depth corresponding to the particular instance of logic interface, and data/validation signals within the same instance of logic interface must produce the same delay. Flop 208 is connected to block 203 and flop 207 is connected to block 203 and 202. Flops 207 and 208 are configured to delay incoming logic interfaces received by receiver block 201. A receiver wrapper comprising two additional top-level flops 209 and 210 is also automatically generated for receiver block 204 based on the logical signal groupings and the design constraints. According to some embodiments, the flops are always associated with the receiving block.

Figure 3:
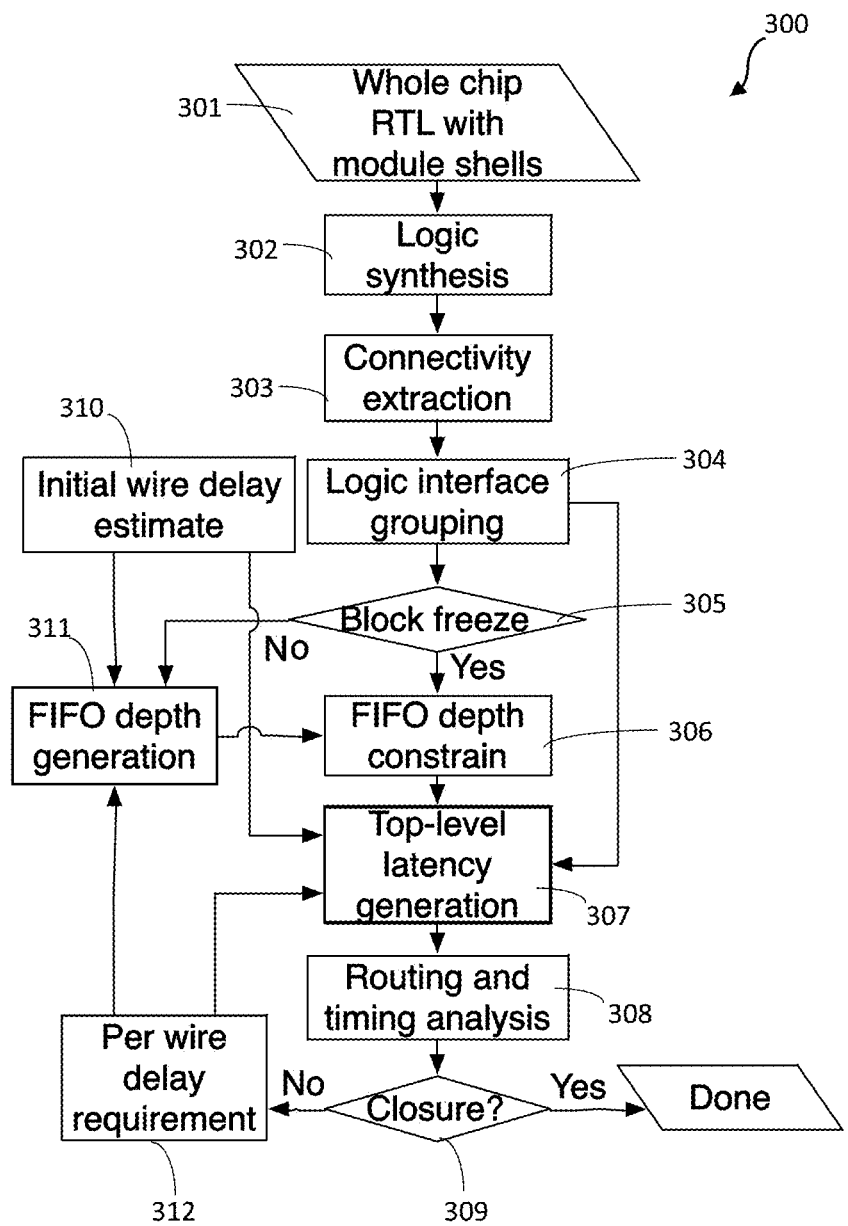
FIG. 3 is a flow chart depicting an exemplary design flow for designing an integrated circuit (e.g., a chip) using logical signal grouping according to embodiments of the present invention.

With regard to FIG. 3, an exemplary design flow 300 for designing an integrated circuit using logical signal grouping is depicted according to embodiments of the present invention. The process begins at step 301 with an RTL (register-transfer level) description of the entire chip with module shells. RTL is one of the most common design abstractions in digital circuit design and models a digital circuit based on the flow of digital signals (data) between hardware registers and logical operations that are performed on those digital signals. This level of abstraction is a higher level of abstraction than the transistor level and the logic gate level, for example. Knowledge of internal functions of the modules themselves is not necessary at this stage. The RTL description is converted to a gate-level description (e.g., Structural Verilog) of the digital circuit using a logical synthesis tool at step 302. The gate-level description may be used later by placement and routing tools to generate a physical layout, and logical simulation tools may be used to verify the integrity of an RTL description. At step 303, connectivity extraction determines the connectivity (e.g., wires) between module shells. At step 304, the connectivity between shells is used to generate groups of logical interfaces with associated rules/protocols defined in a structured document (e.g., an XML file). At block 305, it is determined if blocks/shells of the design (e.g., a FIFO queue) are frozen (cannot be altered). If all of the blocks/shells of the design can be modified, the design flow proceeds to step 311. At step 311, a queue depth is generated based on the shells, the logical signal groupings, and an initial wire delay estimate 310. The initial wire delay estimate 310 may be determined based on a first order physical design analysis. After the initial queue depth has been determined, a queue depth constraint 306 is applied to generate a top-level latency 307. Routing and timing analysis 308 is then performed to determine if the timing between blocks/shells can be reconciled (e.g., closed) at step 309. Timing closure is the process by which a chip design is adjusted to meet defined timing requirements. These modifications are typically performed by tools based on defined constrains (e.g., clock frequency). At the end of a successful design process, the timing requirements must be satisfied/closed.

If timing closure step 309 is not successful, the process proceeds to step 312, where the delay requirements are determined for each wire of the chip based on the previous timing analysis. Per wire delay requirements 312 may be used as feedback from the timing stage when the previous delay estimate does not meet the design constraints. Steps 306-309 are repeated until timing closure is successful based on the two described design constraints. First, the round trip delay comprising the sum of a data line/bus latency and a flow control latency must be less than the depth of the queue. Second, data and validation lines/buses within the same instance of logical interfaces must experience substantially the same chip-level latency. If timing closure 309 is still not successful, new per wire delay requirements 312 are generated to manipulate the round trip latency, and steps 306-309 are again repeated. This process continues with new per wire delay requirements 312 until timing closure 309 is successful.

TABLE I

```
//Module logic interface type based latency, naming:
modName__intfType__TS__RTT
/*Routed */ 'define
XP__SEARCH__SE__PU0__LDE__SE__REQ__TS__RTT 6
```

Table I depicts exemplary code for defining round-trip latency based on logical interface type. The round-trip latencies may be used to determine the size of the receiver block's FIFO queue/buffer. XP_SEARCH_SE_PU0_LDE_SE_REQ_TS_RTT is a string that references an exemplary logical interface type. The various types of logical interfaces may be grouped in an XML file with associated rules. The '6' following the string indicates a signal latency associated with the logical interface type, measured in clock cycles.

TABLE II

```
//Module logic interface instance based latency, naming:
modName__intfType__intfInst__TS__RTT
/*Routed */ 'define
XP__SEARCH__SE__PU0__LDE__SE__REQ__LDE__SE__0__TS__RTT 6
/*Routed */ 'define
XP__SEARCH__SE__PU0__LDE__SE__REQ__LDE__SE__1__TS__RTT 6
/*Routed */ 'define
XP__SEARCH__SE__PU0__LDE__SE__REQ__LDE__SE__10__TS__RTT 3
/*Routed */ 'define
XP__SEARCH__SE__PU0__LDE__SE__REQ__LDE__SE__11__TS__RTT 4
```

Table II depicts exemplary code for defining signal latency based on logical interface instance. The round-trip latencies may be used to determine the size of the receiver block's FIFO queue/buffer. For example, XP_SEARCH_SE_PU0_LDE_SE_REQ_LDE_SE_0_TS_RTT is a string that references an exemplary logical interface 'instance 0'. The other strings represent 'instance 1', '10', and '11' of the same logical interface type. The number following the string indicates signal latency. For example, instance 0 is associated with a round-trip latency of 6 cycles, instance 1 is associated with a round-trip latency of 6 cycles, instance 10 is associated with a round-trip latency of 3 cycles, and instance 11 is associated with a round-trip latency of 4 cycles.

TABLE III

```
//Cell logic interface instance based latency, naming convention: cellName__intfType__intfInst__TS__RTT
/*Routed */ 'define XP__SEARCH__0__U__SE__0__U__PU0__LDE__SE__REQ__LDE__SE__0__TS__FWD__LAT 3
/*Routed */ 'define XP__SEARCH__0__U__SE__0__U__PU0__LDE__SE__REQ__LDE__SE__0__TS__BKWD__LAT 2
```

Table III depicts exemplary code for defining signal latency based on logical interface instance for each direction (forward and backward). For example, XP_SEARCH_0_U_SE_0_U_PU0_LDE_SE_0_TS_FWD_LAT is a string that references an exemplary forward logical signal (e.g., a data signal or validation signal) of a first interface type, and XP_SEARCH_0_U_SE_0_U_PU0_LDE_SE_0_TS_BKWD_LAT is a string that references an exemplary backward logical signal (e.g., a flow control signal) of the same interface type. The forward signal is associated with a signal latency of 3 cycles, and the backward signal is associated with a signal latency of 2 cycles. These latencies indicate the number of flop stages on the wires within the interface used for physical design timing closure.

Whether receiver block queue depth is designed per logic interface type or per logic interface instance, the chip must be designed such that a sum of per logic interface instance forward and backward latency is less than the queue depth corresponding to the logic interface instance. The queue is always associated with the block that is receiving data form the sender block. According to some embodiments, the receiver block queue depth further includes an additional one or more clock cycles to compensate for the time it takes the sender block to react to the flow control signal once it is received. By changing the signal delay associated with a logic interface instance per direction, it is possible to alter the associated round trip latency (e.g., by inserting additional flops) to give the sender block more time to process data before additional data is received, while still meeting the constraint where round trip latency is less than the queue depth. Furthermore, all data and validation signals/lines within the same logic interface instance must experience the same latency at the chip level.

A functional module produced using the above techniques can be simulated in a verification environment to confirm that all design constraints are met. Typically one block is verified at a time. The receiver block is verified to confirm that the queue (e.g., FIFO) of the receiver does not overflow. Also, the sender block can be simulated to verify that the validation signal of the sender block is de-asserted one cycle after a falling edge of the flow control signal.

Figure 4:
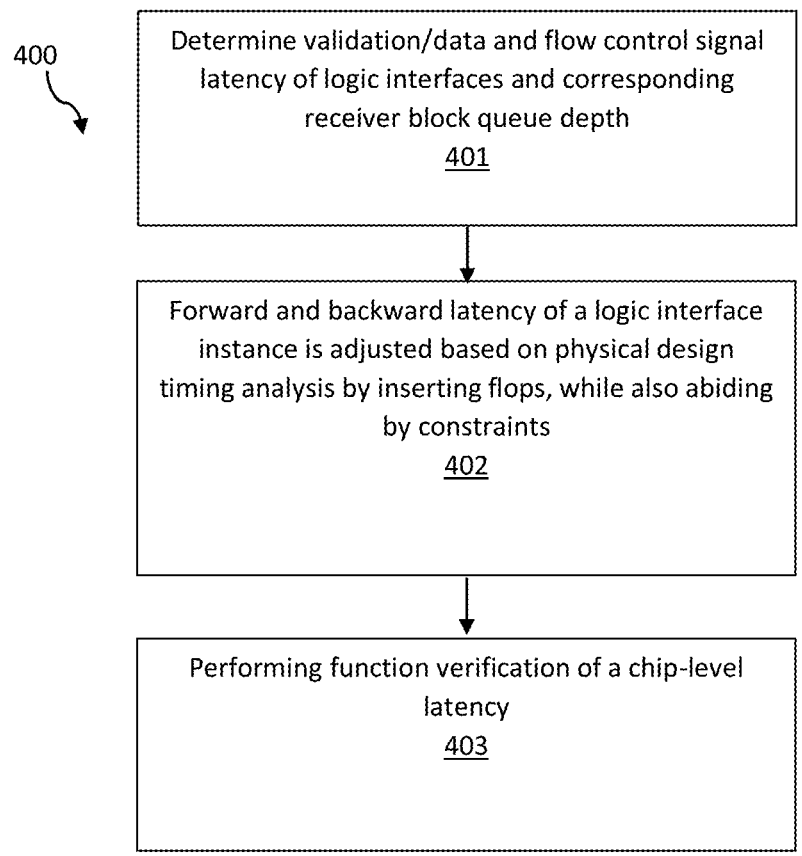
FIG. 4 is a flow chart depicting an exemplary series of computer implemented steps for delaying a signal to prevent buffer overflow according to embodiments of the present invention.

With regard to FIG. 4, a flow chart 400 depicting an exemplary series of computer implemented steps for delaying a signal to prevent buffer overflow is depicted according to embodiments of the present invention. At step 401, validation/data and flow control signal latency of logic interfaces and corresponding receiver block queue depth is determined based on initial physical design analysis. At step 402, forward and backward latency of a logic interface instance is adjusted based on physical design timing analysis by inserting flops, while also abiding by constraints (e.g., receiver block FIFO queue depth). According to some embodiments, steps 403 is also performed. At step 403, functional verification of a chip-level latency is performed. According to some embodiments, the functional verification comprises performing a block-level simulation.

Embodiments according to the present disclosure are thus described. While the present disclosure has been described in particular embodiments, it is intended that the invention shall be limited only to the extent required by the appended claims and the rules and principles of applicable law.

What is claimed is:

1. A method for producing signal latency to prevent buffer overflow, the method comprising:
   determining a first flop latency of a data bus and a second flop latency of a validation bus, between a sender block and a receiver block, and wherein the receiver block comprises a buffer;
   inserting a first set of one or more flops on a flow control line between the sender block and the receiver block to produce a third flop latency, wherein the flow control line transmits a flow control signal from the receiver block to the sender block to control a transfer rate of data sent by the sender block;
   determining a round trip latency between the sender block and the receiver block, wherein the round trip latency is a sum of the first flop latency, the third flop latency, and a reaction delay of the sender block to the flow control signal;
   determining a depth of the buffer of the receiver block based at least on shells of the buffer; and
   altering the round trip latency by inserting a second set of one or more flops on the data bus between the sender block and the receiver block, based on the determined depth of the buffer.

2. The method of claim 1, wherein the determining the first flop latency of the data bus and the second flop latency of the validation bus, between the sender block and the receiver block, uses a register-transfer level (RTL) description comprising a set of logical interfaces.

3. The method of claim 1, wherein the determining the first flop latency of the data bus and the second flop latency of the validation bus, between the sender block and the receiver block, uses a register-transfer level (RTL) description, and wherein the RTL description is generated based on a structured document defining groups of logical interfaces and associated rules and/or protocols.

4. The method of claim 1, further comprising inserting a third set of one or more flops on the validation bus between the sender block and the receiver block.

5. The method of claim 3, wherein the RTL description comprises behavioral code.

6. The method of claim 1, wherein the buffer is a first-in-first-out (FIFO) queue.

7. The method of claim 1, wherein a total number of flops inserted on the flow control line and the data bus is based on a physical design requirement.

8. The method of claim 7, wherein the physical design requirement comprises a timing requirement.

9. The method of claim 1, further comprising performing functional verification of a chip-level latency.

10. The method of claim 9, wherein the performing functional verification comprises performing a block-level simulation.

11. The method of claim 1, wherein the reaction delay of the sender block is one clock cycle.

12. The method of claim 1, wherein the first flop latency and the second flop latency are equal.

13. A non-transitory computer program product tangibly embodied in a computer-readable storage device and comprising instructions that when executed by a processor cause the processor to perform a method for producing signal latency to prevent buffer overflow, the method comprising:
   determining a first flop latency of a data bus and a second flop latency of a validation bus, between a sender block and a receiver block, and wherein the receiver block comprises a buffer;
   inserting a first set of one or more flops on a flow control line between the sender block and the receiver block to produce a third flop latency, wherein the flow control line transmits a flow control signal from the receiver block to the sender block to control a transfer rate of data sent by the sender block;
   determining a round trip latency between the sender block and the receiver block, wherein the round trip latency is a sum of the first flop latency, the third flop latency, and a reaction delay of the sender block to the flow control signal;
   determining a depth of the buffer of the receiver block based at least on shells of the buffer; and
   altering the round trip latency by inserting a second set of one or more flops on the data bus between the sender block and the receiver block, based on the determined depth of the buffer.

14. The method of claim 13, wherein the determining the first flop latency of the data bus and the second flop latency of the validation bus, between the sender block and the receiver block, uses a register-transfer level (RTL) description comprising a set of logical interfaces.

15. The method of claim 13, wherein the determining the first flop latency of the data bus and the second flop latency of the validation bus, between the sender block and the receiver block, uses a register-transfer level (RTL) description, and wherein the RTL description is generated based on a structured document defining groups of logical interfaces and associated rules and/or protocols.

16. The method of claim 13, further comprising inserting a third set of one or more flops on the validation bus between the sender block and the receiver block.

17. The method of claim 15, wherein the RTL description comprises behavioral code.

18. The method of claim 13, wherein the buffer is a first-in-first-out (FIFO) queue.

19. The method of claim 13, wherein a total number of flops inserted on the flow control line and the data bus is based on a physical design requirement.

20. The method of claim 19, wherein the physical design requirement comprises a timing requirement.

21. The method of claim 13, further comprising performing functional verification of a chip-level latency.

22. The method of claim 21, wherein the performing functional verification comprises performing a block-level simulation.

23. The method of claim 13, wherein the reaction delay of the sender block is one clock cycle.

24. The method of claim 13, wherein the first flop latency and the second flop latency are equal.

25. A system comprising:
  at least one processor; and
  at least one computer-readable storage device comprising instructions that when executed by a processor, cause performance of a method for producing signal latency to prevent buffer overflow, the method comprising:
    determining a first flop latency of a data bus and a second flop latency of a validation bus, between a sender block and a receiver block, and wherein the receiver block comprises a buffer;
    inserting a first set of one or more flops on a flow control line between the sender block and the receiver block to produce a third flop latency, wherein the flow control line transmits a flow control signal from the receiver block to the sender block to control a transfer rate of data sent by the sender block;
    determining a round trip latency between the sender block and the receiver block, wherein the round trip latency is a sum of the first flop latency, the third flop latency, and a reaction delay of the sender block to the flow control signal;
    determining a depth of the buffer of the receiver block based at least on shells of the buffer; and
    altering the round trip latency by inserting a second set of one or more flops on the data bus between the sender block and the receiver block, based on the determined depth of the buffer.

26. The system of claim 25, wherein the determining the first flop latency of the data bus and the second flop latency of the validation bus, between the sender block and the receiver block uses a register-transfer level (RTL) description comprising a set of logical interfaces.

27. The system of claim 25, wherein the determining the first flop latency of the data bus and the second flop latency of the validation bus, between the sender block and the receiver block, uses a register-transfer level (RTL) description, and wherein the RTL description is generated based on a structured document defining groups of logical interfaces and associated rules and/or protocols.

28. The system of claim 25, further comprising inserting a third set of one or more flops on the validation bus between the sender block and the receiver block.

29. The system of claim 27, wherein the RTL description comprises behavioral code.

30. The system of claim 25, wherein the buffer is a first-in-first-out (FIFO) queue.

31. The system of claim 25, wherein a total number of flops inserted on the flow control line and the data bus is based on a physical design requirement.

32. The system of claim 31, wherein the physical design requirement comprises a timing requirement.

33. The system of claim 25, further comprising performing functional verification of a chip-level latency.

34. The system of claim 33, wherein the performing functional verification comprises performing a block-level simulation.

35. The system of claim 25, wherein the reaction delay of the sender block is one clock cycle.

36. The system of claim 25, wherein the first flop latency and the second flop latency are equal.

* * * * *